United States Patent
Radovsky

[19]
[11] Patent Number: 6,100,620
[45] Date of Patent: Aug. 8, 2000

[54] HIGH FREQUENCY SYNCHRONOUS ROTARY ELECTRICAL MACHINE

[75] Inventor: Alexander Radovsky, Haifa, Israel

[73] Assignee: S.H.R. Ltd. BVI, Tel Aviv, Israel

[21] Appl. No.: 09/148,989

[22] Filed: Sep. 8, 1998

Related U.S. Application Data

[63] Continuation-in-part of application No. 08/947,862, Oct. 9, 1997, which is a continuation-in-part of application No. 08/823,671, Mar. 24, 1997, Pat. No. 5,798,594.

[30] Foreign Application Priority Data

Aug. 5, 1996 [IL] Israel ........................................ 119010

[51] Int. Cl.$^7$ .................................................... H02K 1/22
[52] U.S. Cl. ...................... 310/268; 310/49 R; 310/156; 310/259; 310/261; 310/263
[58] Field of Search ................................. 310/49 R, 259, 310/156, 261, 263

[56] References Cited

U.S. PATENT DOCUMENTS

| | | | |
|---|---|---|---|
| 3,992,641 | 11/1976 | Heinrich et al. ........................ | 310/168 |
| 4,330,724 | 5/1982 | Goddijn ................................ | 310/49 R |
| 4,406,958 | 9/1983 | Palmero et al. ....................... | 310/49 R |
| 4,518,883 | 5/1985 | Oudet .................................... | 310/49 R |
| 4,700,098 | 10/1987 | Kawashima ............................. | 310/186 |
| 4,703,243 | 10/1987 | Ettelman et al. ........................ | 318/696 |
| 4,739,201 | 4/1988 | Brigham et al. ........................ | 310/49 R |
| 4,758,756 | 7/1988 | Pouillange ............................. | 310/152 |
| 5,030,864 | 7/1991 | Van Hout et al. ...................... | 310/67 R |
| 5,272,401 | 12/1993 | Lin ......................................... | 310/49 R |
| 5,289,064 | 2/1994 | Sakamoto ............................... | 310/49 R |
| 5,410,200 | 4/1995 | Sakamoto et al. ..................... | 310/49 R |
| 5,708,310 | 1/1998 | Sakamoto et al. ..................... | 310/49 R |
| 5,856,714 | 1/1999 | Sugiura .................................. | 310/49 R |

*Primary Examiner*—Elvin Enad
*Attorney, Agent, or Firm*—Mark M. Friedman

[57] ABSTRACT

A synchronous rotary electrical machine. According to the first aspect of the present invention, the electrical phase difference between the stator teeth and the nearest rotor teeth is a stepwise function of azimuthal stator tooth position. In a preferred embodiment of the present invention, the stator teeth grouped into two or more sets, and the machine is multiphase. Each set is associated with an armature winding wound in a plane perpendicular to the rotational axis of the machine. The rotor teeth are spaced at the same pitch as the stator teeth of a single set. When direct electrical current is provided to an excitation winding concentric with the rotational axis, an m-phase alternating EMF is induced in the armature windings. With two tandem groups of such sets of stator teeth, each with its own tooth pitch, alternating EMFs of different frequencies are generated. Two alternating EMFs of different frequencies are heterodyned to provide alternating EMF at the difference frequency. According to the second aspect of the present invention, the rotor and the stator are axially adjacent, and the facing rotor and stator teeth are at the same radial distance from the rotational axis. If the machine is single phase, there are equal numbers of facing rotor and stator teeth. If a rotor is between two sets of stator teeth, the two sets can have different numbers of teeth, allowing the generation of alternating EMFs of different frequencies, and the heterodyning thereof to provide alternating EMF at the difference frequency.

23 Claims, 10 Drawing Sheets

HIGH FREQUENCY SYNCHRONOUS ROTARY ELECTRICAL MACHINE

This is a continuation in part of U.S. patent application Ser. No. 08/947,862, filed Oct. 9, 1997, which is a continuation in part of U.S. patent application Ser. No. 08/823,671, filed Mar. 24, 1997, now U.S. Pat. No. 5,798,594, issued Aug. 25, 1998.

FIELD AND BACKGROUND OF THE INVENTION

The present invention relates to electrical machinery and, more particularly, to high frequency synchronous rotary electrical generators and motors.

FIG. 1 shows, in axial cross section, a high frequency synchronous rotary electrical generator 10 of the prior art. Projecting radially inwardly from the inner wall of a cylindrical yoke 12 are a plurality of stator teeth 14, around which are wound armature windings 16. There are two groups of stator teeth 14, on either axial side of an annular excitation winding 18 that is rigidly attached to and concentric with yoke 12. Also concentric with yoke 12, and rotatably mounted within yoke 12 on bearings (not shown), are a shaft 20 and a rotor 22. A plurality of rotor teeth 24 project radially outward from rotor 22 opposite stator teeth 14. Note that armature windings 16 are wound, through the slots that define stator teeth 14, in planes that are parallel to shaft 20.

Windings 14 and 16 are made of a good electrical conductor such as copper wire or aluminum wire. Yoke 12, stator teeth 14, rotor 22 and rotor teeth 24 are made of a ferromagnetic material such as iron, so that when a DC current is applied to excitation winding 18, a poloidal magnetic field, represented by dashed loops 26, is set up through yoke 12, rotor 22, and teeth 14 and 24. Turning shaft 20 sweeps teeth 24 past teeth 14, causing a temporal variation in the magnetic flux linking teeth 24 and 24, thereby inducing an AC EMF in armature windings 16.

There are at least two deficiencies in the design of generator 10. One is that generator 10 is structurally inefficient, inasmuch as the portions of armature windings 16 that project axially beyond rotor teeth 14 do not participate in torque creation. The other is that it is difficult to automate the winding of windings 14. In large versions of generator 10, windings 14 are wound by hand.

There is thus a widely recognized need for, and it would be highly advantageous to have, a design for a synchronous rotary electrical machine that is more efficient, and whose construction is easier to automate, than the prior art machines.

SUMMARY OF THE INVENTION

According to the present invention there is provided a synchronous electrical machine including: (a) a stator including a first plurality of stator teeth disposed in a circle around a rotational axis, each of the stator teeth of the first plurality being at a certain azimuthal position on the stator; and (b) at least one rotor, coaxial with the stator on the rotational axis, the at least one rotor including a first plurality of rotor teeth disposed in a circle around the rotational axis, the rotor operative to assume a plurality of rotational positions relative to the stator, so that in each of the plurality of rotational positions, an electrical phase difference between each of the stator teeth of the first plurality and an azimuthally nearest of the rotor teeth of the first plurality is a stepwise function of the azimuthal position of the each stator tooth of the first plurality.

According to the present invention there is provided a method of generating multiphase alternating EMF, including the steps of: (a) providing a generator including: (i) a stator including a plurality of stator teeth disposed in a circle around a rotational axis, each of the stator teeth being at a certain azimuthal position on the stator, (ii) a rotor, coaxial with the stator on the rotational axis, the rotor including a plurality of rotor teeth disposed in a circle around the rotational axis, the rotor operative to rotate about the rotational axis so that, at any rotational position of the rotor relative to the stator, an electrical phase difference between each of the stator teeth and an azimuthally nearest rotor tooth is a stepwise function of the azimuthal position of the each stator tooth, (iii) a plurality of armature windings, each of the armature windings associated with a different at least one of the stator teeth, and (iv) an excitation winding, rigidly attached to the stator and coaxial with the rotational axis; (b) supplying direct current to the excitation winding; and (c) rotating the rotor about the rotational axis, thereby inducing alternating ENF at different relative phases in each of the armature windings.

According to the present invention there is provided a method of generating low frequency alternating EMF, including the steps of: (a) providing a generator including: (i) a stator including at least one first stator tooth and at least one second stator tooth, (ii) at least one rotor operative to rotate about a rotational axis with respect to the stator, (iii) a first plurality of rotor teeth rigidly attached to one of the at least one rotor and disposed in a circle around the rotational axis at a first tooth pitch, so that as the at least one rotor is rotated about the rotational axis, the first plurality of rotor teeth sweeps past the at least one first stator tooth, (iv) a second plurality of rotor teeth rigidly attached to one of the at least one rotor and disposed in a circle around the rotational axis at a second tooth pitch different from the first tooth pitch, so that as the at least one rotor is rotated about the rotational axis, the second plurality of rotor teeth sweeps past the at least one second stator tooth, (v) a first armature winding associated with the at least one first stator tooth, (vi) a second armature winding associated with the at least one second stator tooth, and (vii) at least one excitation winding, rigidly attached to the stator, coaxial with the rotational axis; (b) supplying direct current to the excitation winding; (c) rotating the at least one rotor about the rotational axis, thereby inducing alternating EMFs of two different frequencies in the armature windings; and (d) heterodyning the alternating EMFs induced in the armature windings, thereby generating the low frequency alternating EMF.

According to the present invention there is provided a synchronous electrical machine, including: (a) a stator including at least one first stator tooth and at least one second stator tooth; (b) at least one rotor operative to assume a plurality of rotational positions about a rotational axis with respect to the stator; (c) a first plurality of rotor teeth rigidly attached to one of the at least one rotor and disposed in a circle around the rotational axis at a first tooth pitch, so that as the at least one rotor is rotated about the rotational axis, the first plurality of rotor teeth sweep past the at least one first stator tooth; (d) a second plurality of rotor teeth rigidly attached to one of the at least one rotor and disposed in a circle around the rotational axis at a second tooth pitch different from the first tooth pitch, so that as the at least one rotor is rotated about the rotational axis, the second plurality of rotor teeth sweep past the at least one second stator tooth; (e) a first armature winding associated with the at least one first stator tooth; (f) a second armature winding associated with the at least one second stator tooth; and (g) at least one excitation winding, rigidly attached to the stator, and coaxial with the rotational axis.

According to the present invention there is provided a synchronous electrical machine, including: (a) a stator, including a first plurality of stator teeth disposed in a circle about a rotational axis; and (b) a rotor, axially adjacent to at least a portion of the first stator and free to rotate with respect to the stator about the rotational axis, the rotor including a first plurality of rotor teeth that sweep past the first plurality of stator teeth as the rotor rotates with respect to the stator.

According to the present invention there is provided a method of generating low frequency alternating EMF, including the steps of: (a) providing a generator including: (i) a stator including at least one first stator tooth and at least one second stator tooth, (ii) at least one rotor, axially between the at least one first stator tooth and the at least one second stator tooth, and operative to rotate about a rotational axis with respect to the stator, (iii) a first plurality of rotor teeth rigidly attached to one of the at least one rotor and disposed in a circle around the rotational axis so that as the at least one rotor is rotated about the rotational axis, the first plurality of rotor teeth sweeps past the at least one first stator tooth, (iv) a second plurality of rotor teeth rigidly attached to one of the at least one rotor and disposed in a circle around the rotational axis so that at the at least one rotor is rotated about the rotational axis, the second plurality of rotor teeth sweeps past the at least one second stator tooth, the second plurality of rotor teeth being different in number than the first plurality of rotor teeth, (v) two armature windings, rigidly attached to the stator, the rotor being axially between the two armature windings, and (vi) two excitation windings, rigidly attached to the stator and coaxial with the rotational axis, the rotor being axially between the two excitation windings; (b) supplying direct current to the excitation windings; (c) rotating the at least one rotor about the rotational axis, thereby inducing alternating EMFs of two different frequencies in the two armature windings; and (d) heterodyning the alternating EMFs induced in the two armature windings, thereby generating the low frequency alternating EMF.

As is common to all rotary electrical machines, an electrical machine of the present invention includes a stator and a rotor with a common rotational axis. Commonly, as in the prior art electrical machine discussed above, both the stator and the rotor bear teeth disposed in a circle concentric with the rotational axis. According to the first aspect of the present invention, what distinguishes an electrical machine of the present invention from the prior art electrical machines is the relationship between the stator teeth and the rotor teeth. At any position of the stator relative to the rotor, the electric phase difference between the stator teeth and the nearest rotor teeth is a stepwise function of azimuthal stator tooth position. Preferably, this is achieved by grouping the stator teeth into a plurality of sets. Within each set, the stator teeth are separated from each other azimuthally by a certain tooth pitch. The sets are separated from each other by a certain set pitch that is a multiple of the tooth pitch. Specifically, the set pitch is the tooth pitch multiplied by the sum of a non-negative integer and the reciprocal of the number of sets of stator teeth.

Associated with each' set of stator teeth is an armature winding, wound in a plane perpendicular to the rotational axis. In one preferred embodiment of an electrical machine of the present invention, each armature winding is radially inward from the corresponding set of stator teeth. In another preferred embodiment of an electrical machine of the present invention, each armature winding is wound around the corresponding set of stator teeth.

Usually, there are two groups of such stator teeth sets and associated armature windings, displaced axially from each other. There also are one or more toroidal excitation windings, rigidly attached to the stator yoke and concentric with the rotational axis. In different embodiments of an electrical machine of the present invention, there may be one or two excitation windings between two groups of stator teeth sets, or two excitation windings axially outboard of two groups of stator teeth sets. Direct electrical current is applied to the excitation winding or windings. As the rotor rotates relative to the stator and the rotor teeth sweep past the stator teeth, alternating EMFs are induced in the armature windings. Because the spacing between the stator tooth sets is not equal to the tooth pitch within a particular set, the alternating EMFs have different phases, spaced apart by 360° divided by the number of stator tooth sets. So, for example, such an electrical machine of the present invention with three groups of stator teeth produces three-phase alternating EMF.

The pitch between stator teeth of a set is the same for all sets of a single group, but this inter-tooth pitch need not be the same for two different groups. Thus, alternating EMFs of two different frequencies may be generated by the same generator. In addition, the two EMFs may be heterodyned to produce alternating EMF at the difference frequency.

In the prior art generator of FIG. 1, the rotor is radially inward from the stator. According to a second aspect of the present invention, the rotor is axially adjacent to the stator, and the rotor and stator teeth are at substantially the same radial distance from the rotational axis. Under this aspect of the present invention, the electrical machine may be either single phase or multiphase. In a single phase electrical machine of the present invention, there may be more than one set of mutually facing rotor and stator teeth, but in any one set, there are the same number of rotor and stator teeth. If two sets of rotor and stator teeth have different numbers of teeth, the two sets generate alternating EMFs of two different frequencies. These two EMFs may be heterodyned to produce alternating EMF at the difference frequency.

BRIEF DESCRIPTION OF THE DRAWINGS

The invention is herein described, by way of example only, with reference to the accompanying drawings, wherein.

DESCRIPTION OF THE PREFERRED EMBODIMENTS

The present invention is of a synchronous rotary electrical machine which is geometrically more efficient that similar prior art electrical machines. Specifically, the present invention can be used to generate multi-phase alternating EMF at one or two different frequencies.

The principles and operation of a synchronous electrical machine according to the present invention may be better understood with reference to the drawings and the accompanying description.

Figure 1:
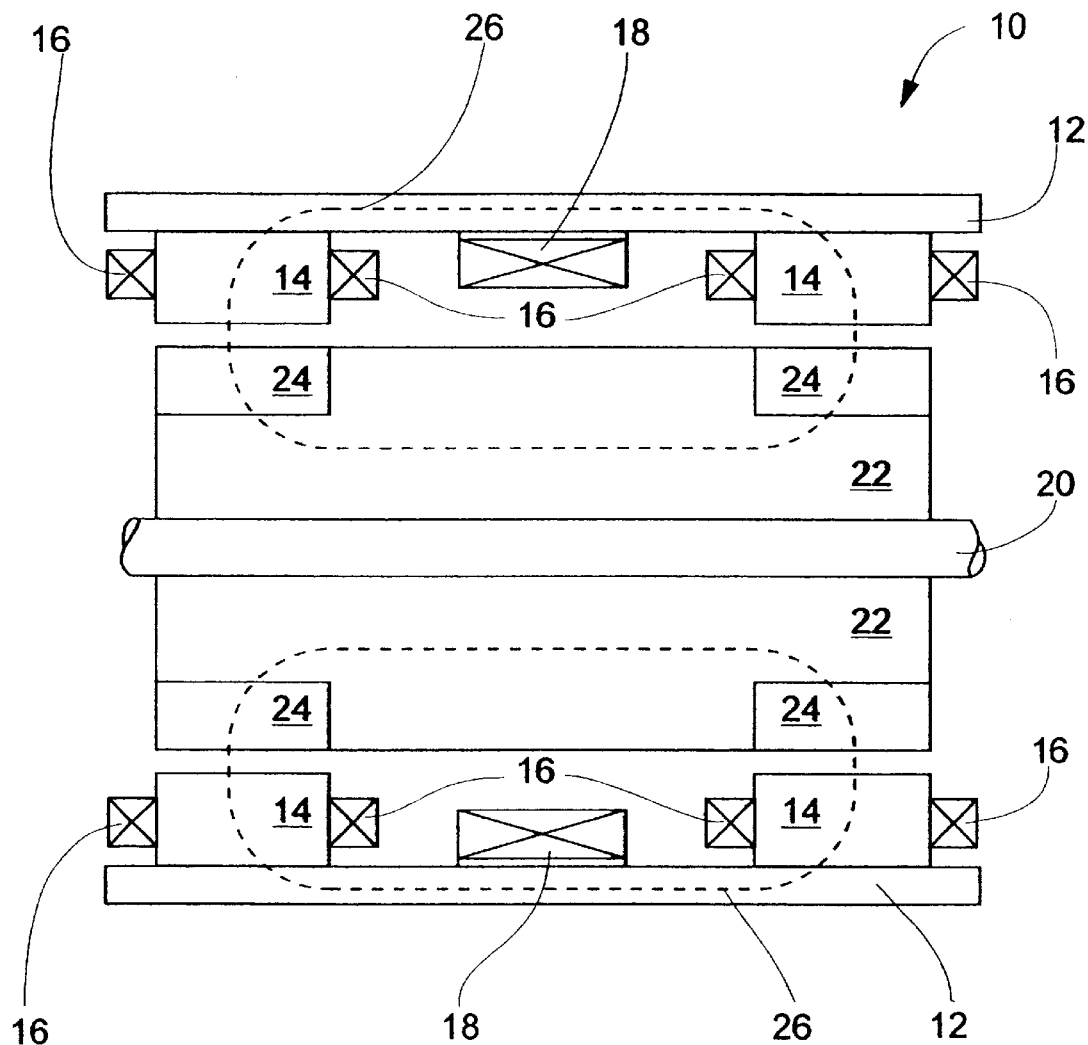
FIG. 1 is an axial cross section of a prior art generator.
Figure 2A:
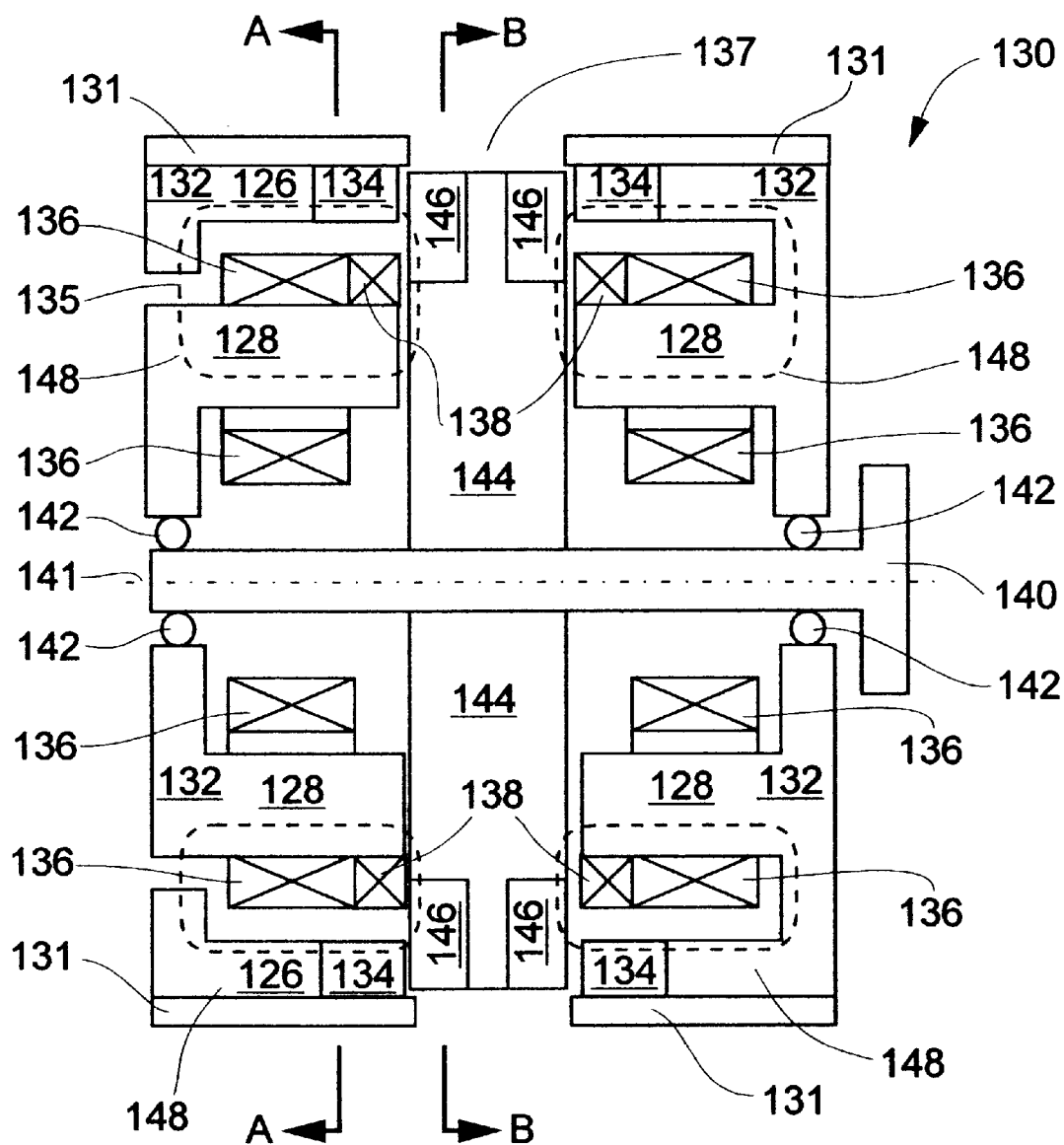
FIG. 2A is an axial cross section of a first embodiment of an electrical machine of the present invention.
Figure 2C:
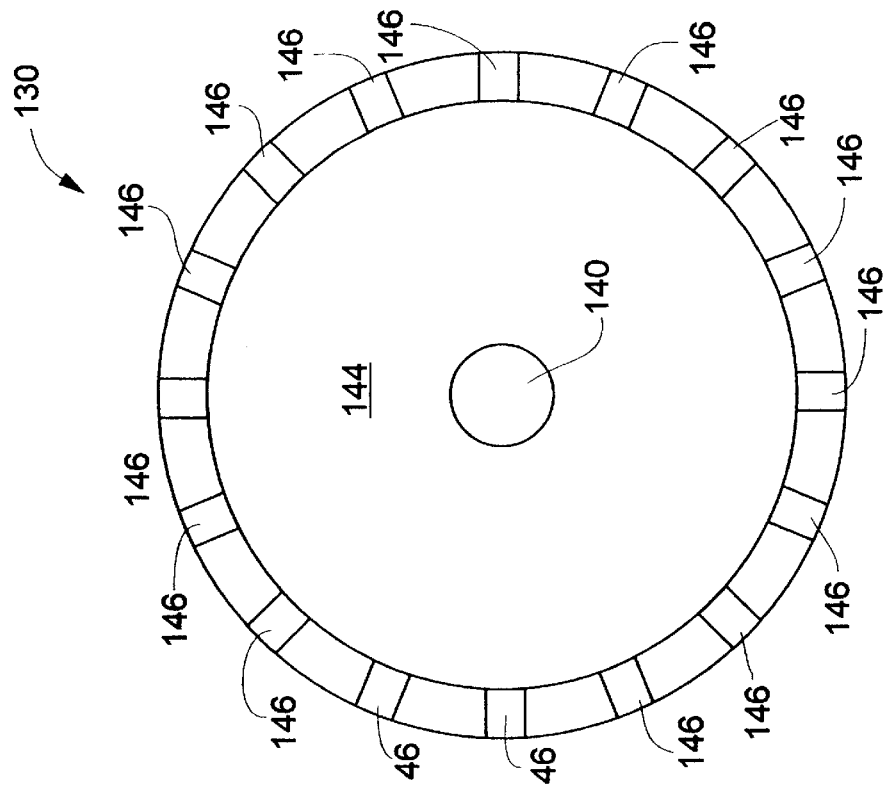
FIGS. 2B and 2C are transverse cross sections of the embodiment of FIG. 2A.
Figure 2B:
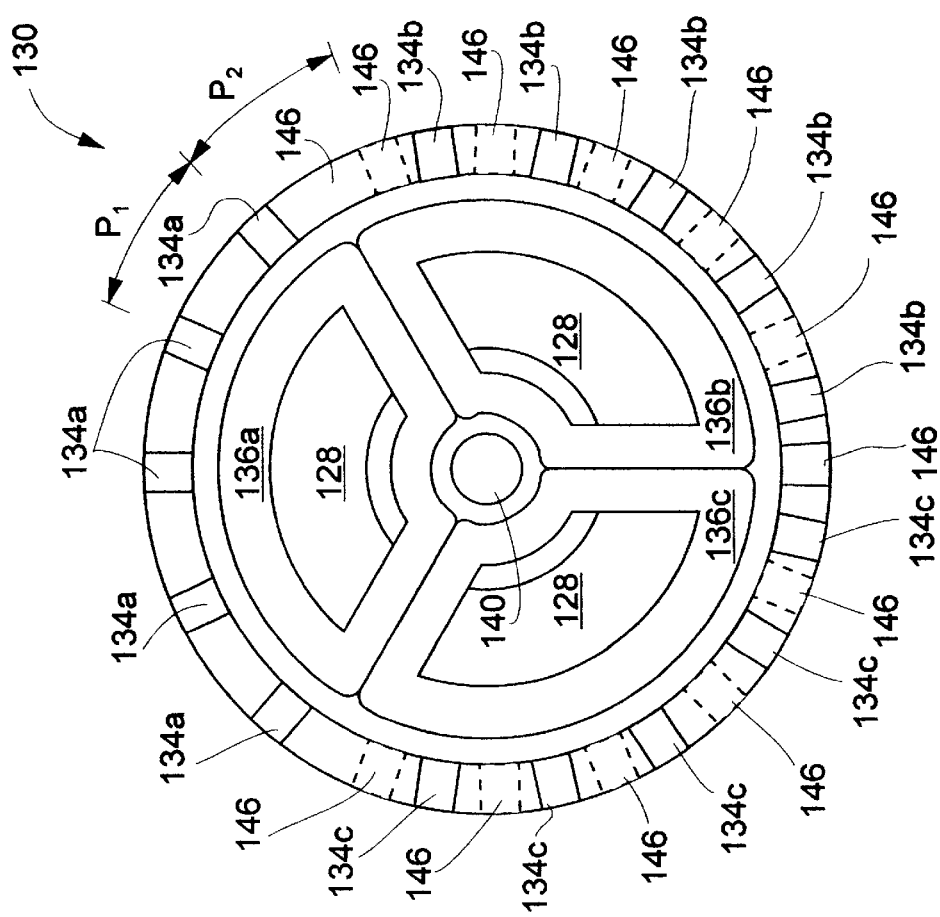

Referring now to the drawings, FIGS. 2A, 2B and 2C are, respectively, an axial cross section and two transverse cross sections of a first embodiment 130 of an electrical machine of the present invention. The cross section of FIG. 2B is along cut A—A of FIG. 2A. The cross section of FIG. 2C is along cut B—B of FIG. 2A. Within a hollow cylindrical nonmagnetic insulating housing 131 is mounted a stator yoke 132 that includes, in each of two matched facing halves thereof, an inner slotted cylinder 128 and an outer cylinder 126. (Note that housing 131 is not shown in FIGS. 2B and 2C.) Both inner cylinder 128 and outer cylinder 126 are concentric with a rotational axis 141. Around the axially inward faces of outer cylinders 126 are rigidly mounted a plurality of stator teeth 134. Each outer cylinder 126 bears three sets of stator teeth 134, labeled a, b, and c in FIG. 2B. Within each set of stator teeth 134, the azimuthal pitch between neighboring stator teeth 134 is an angle $P_1$.

The azimuthal pitch between an outer stator tooth 134 of one set and the neighboring outer stator tooth 134 of the next set is another angle $P_2$. Angles $P_1$ and $P_2$ are related, in general, by $P_2=(n+1/m)P_1$, where n is a non-negative integer and m is the number of sets of stator teeth 134 on an outer cylinder 126. In the particular case illustrated in FIG. 2B, $P_1$ is 22.5°, $P_2$ is 30°, m is 3 and n is 1. Each inner cylinder 128 is divided by slots into three segments that are azimuthally opposite corresponding sets of stator teeth 134. Around each segment of inner cylinder 128 is wound, in a plane perpendicular to rotational axis 141, an armature winding 136. Also wound around each inner cylinder 128, axially inward from armature windings 136, is an annular toroidal excitation winding 138. The illustrated relative axial positions of armature windings 136 and excitation windings 138 is not obligatory. Armature windings 136 alternatively may be axially inward from excitation windings 138.

Rotatably mounted in stator yoke 132, on bearings 142, is a shaft 140. Shaft 140 is free to rotate about rotational axis 141. Rigidly attached to shaft 140 between the two halves of stator yoke 132 is a disk-shaped rotor 144. The periphery of rotor 144 bears two sets of equally spaced rotor teeth 146, with each set of rotor teeth facing stator teeth 134 on the corresponding half of stator yoke 132. Preferably, the tooth pitch of rotor teeth 146 is the same as the pitch angle $P_1$ of the facing stator teeth 134, as illustrated in FIG. 2C for the case of 16 rotor teeth 146 on one side of rotor 144.

Air cooling of embodiment 130 is provided by circulation of air through ports such as port 135 in stator yoke 132 and port 137 in housing 131, impelled by rotating rotor 144 acting as a fan.

Stator yoke 132, stator teeth 134, rotor 144 and rotor teeth 146 are made of a ferromagnetic material such as iron, or of a ferrimagnetic material such as ferrite. If a ferromagnetic material is used, the material is laminated with an insulator to suppress eddy currents. If a ferrimagnetic material such as ferrite is used, the inherent low electrical conductivity of the material suppresses eddy currents. Loops 148 of magnetic flux created by direct electrical current in excitation windings 138 are closed via rotor 144, rotor teeth 146, stator teeth 134 and stator yoke 132.

Figure 3:
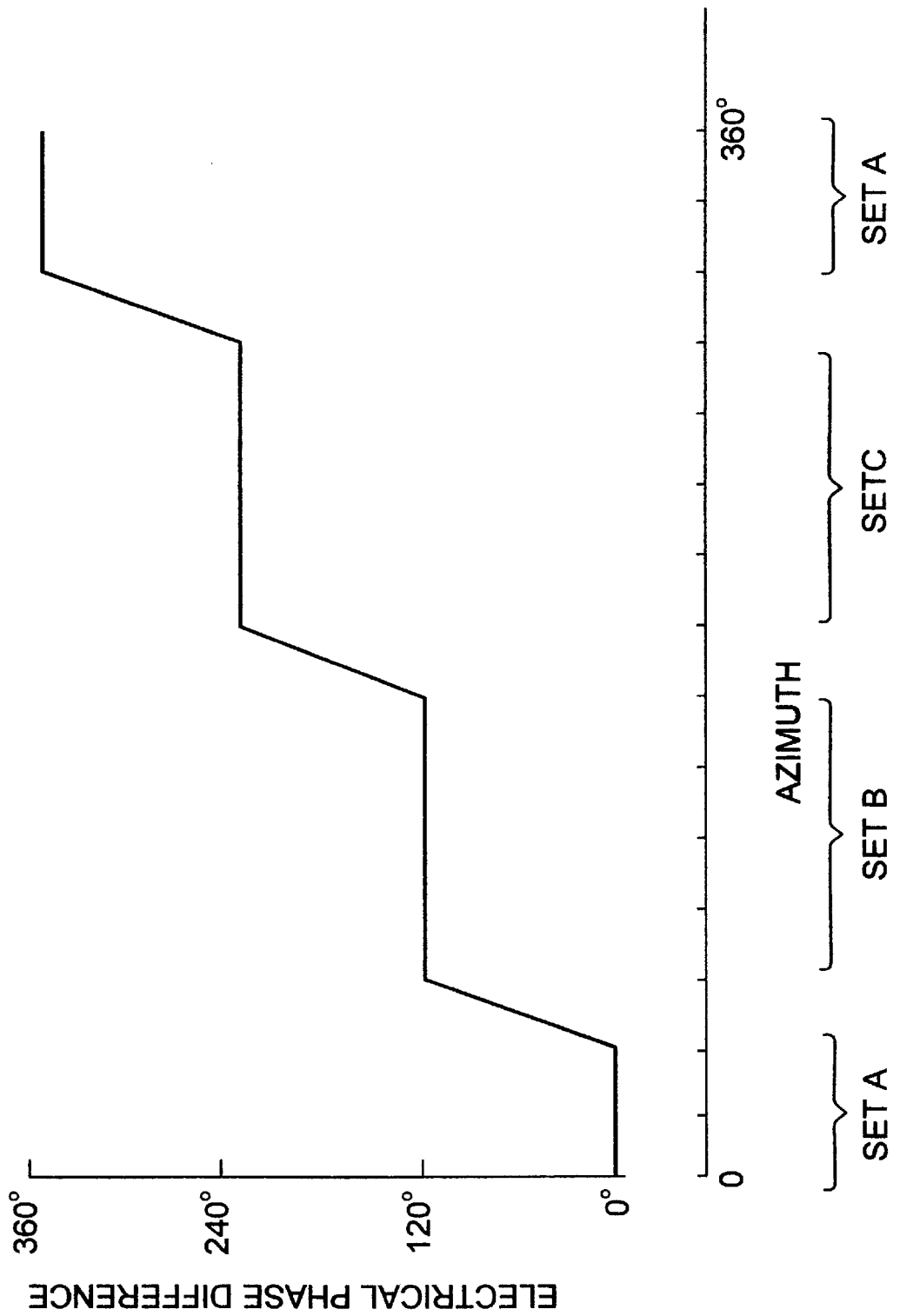
FIG. 3 is a plot of electrical phase difference for FIG. 2B.

In FIG. 2B, rotor teeth 146 of FIG. 2C are drawn in phantom, to indicate the electrical phase relationship between stator teeth 134 and the nearest rotor teeth 146. Note that the top five stator teeth 134 and the top five rotor teeth 146 are in identical azimuthal positions. Suppose for definiteness that rotor 144 rotates clockwise as seen in FIGS. 2B and 2C. Then with rotor 144 and stator yoke 132 in the relative positions shown in FIGS. 2B and 2C, each of stator teeth 134a is at the same relative electrical phase as the nearest rotor tooth 146, each of stator teeth 134b are 120 electrical degrees ahead of the nearest rotor tooth 146, and each of stator teeth 134c is 120 electrical degrees behind, or equivalently 240 electrical degrees ahead of, the nearest rotor tooth 146. FIG. 3 is a graph of this electrical phase difference between stator teeth 134 and the nearest rotor teeth 146, as a function of azimuthal position around outer cylinder 126, with azimuth 0°=360° at the top of FIG. 2B. Correspondingly, the EMFs excited in the three armature coils 136 are 120° out of phase with respect to each other. In other words, each side of embodiment 130 generates three-phase alternating EMF.

The electrical phase difference function of FIG. 3 is monotonically stepwise increasing, meaning that within any one set of stator teeth 134, the electrical phase difference from a stator tooth 134 to the nearest rotor tooth 146 is a constant, and from one set of stator teeth 134 to the next set of stator teeth 134 clockwise around outer cylinder 126, this phase difference increases. If rotor 144 rotates counterclockwise as seen in FIGS. 2B and 2C, this electrical phase difference function is monotonically stepwise decreasing. By contrast, in the most common prior art case, there are equal numbers of stator teeth and rotor teeth facing each other, so that at any position of the rotor relative to the stator, every stator tooth has the same phase relationship with the nearest rotor tooth, so the corresponding electrical phase difference function is a constant rather than a stepwise function. There also are prior art machines in which there are different numbers of stator and rotor teeth facing each other. Typically, the ratio of the number of stator teeth to the number of rotor teeth is a small integer (e.g., 2) or a ratio of small integers (e.g., 3/2). In these prior art machines, both the stator tooth pitch and the rotor tooth pitch are uniform, so that the electrical phase difference function is monotonic (specifically, linear), but not stepwise monotonic.

Figure 4:
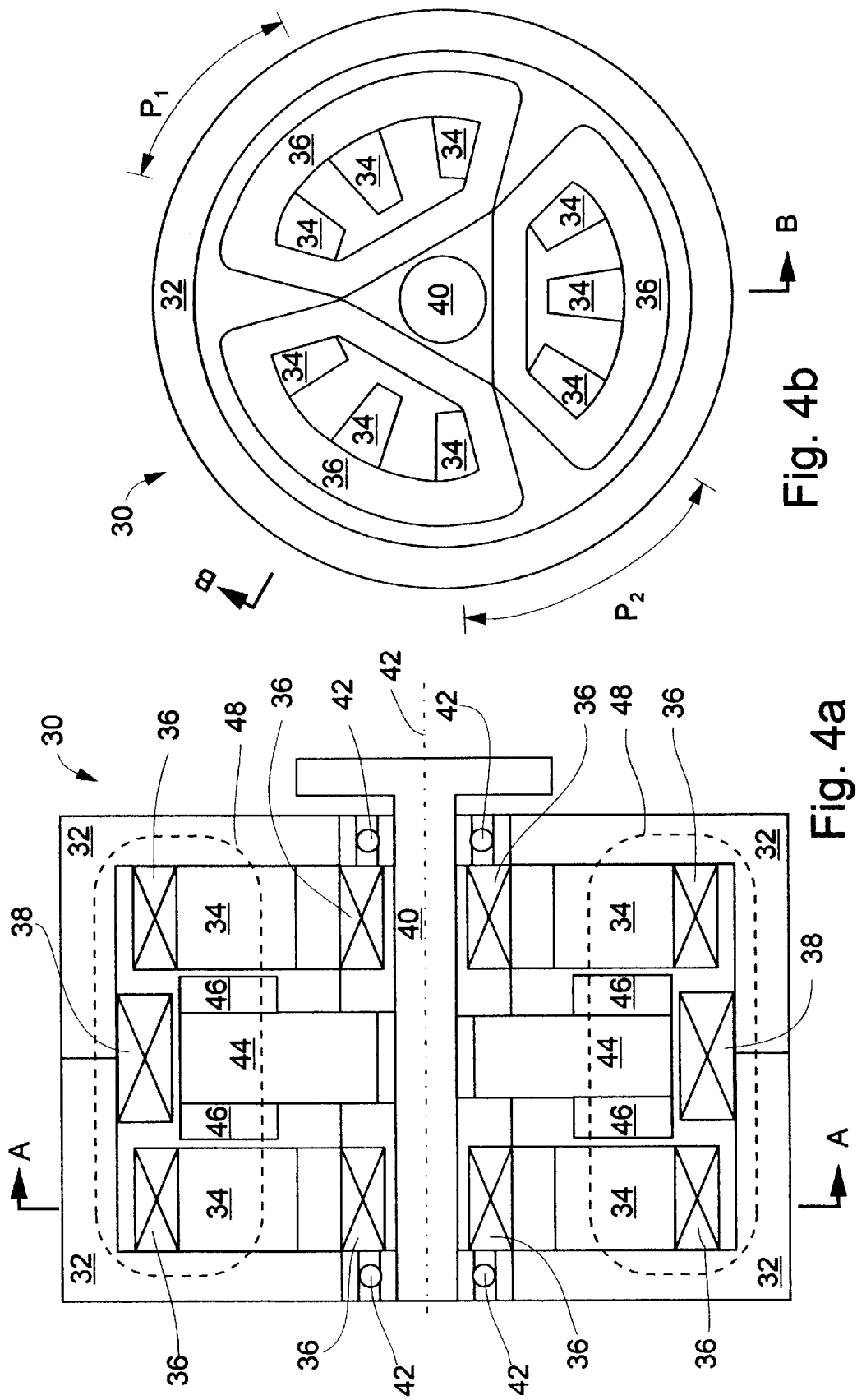
FIG. 4A is an axial cross section of a second embodiment of an electrical machine of the present invention.
FIG. 4B is a transverse cross section of the embodiment of FIG. 4A

FIGS. 4A and 4B are, respectively, axial and transverse cross sections of a second embodiment 30 of an electrical machine of the present invention. The cross section of FIG. 4B is along cut A—A of FIG. 4A. The cross section of FIG. 4A is along cut B—B of FIG. 4B. The stator of embodiment 30 consists of a stator yoke 32 within which are rigidly mounted a plurality of stator teeth 34. On either axial side of embodiment 30 there is a group of three sets of stator teeth 34, each set with three stator teeth 34. Around each set of stator teeth 34 is wound an armature winding 36. Rigidly attached to stator yoke 32 between the two groups of stator teeth 34 is an annular toroidal excitation winding 38.

Rotatably mounted in stator yoke 32, on bearings 42, is a shaft 40. Shaft 40 is free to rotate about a rotational axis 41. Rigidly attached to shaft 40 between the two groups of stator teeth 34 is a disk-shaped rotor 44 from either axial side of which project a plurality of rotor teeth 46. Stator teeth 34 are disposed in a circle around rotational axis 41, so that rotor teeth 46 are radially adjacent to stator teeth 34. As in FIG. 2B, the azimuthal pitch between neighboring stator teeth 34 within each set of stator teeth 34 is angle $P_1$, and the azimuthal pitch between an outer stator tooth 34 of one set and then neighboring outer stator tooth of the next set is angle $P_2$. As in embodiment 130, angles $P_1$ and $P_2$ are related, in general, by $P_2=(n+1/m)P_1$. In embodiment 30, n must be large enough to accommodate the thicknesses of two armature windings 36 between neighboring sets of stator teeth 34. In the particular case illustrated in FIG. 2B, $P_1$ is 30°, $P_2$ is 40°, m is 3 and n is 1. Armature windings 36 are wound around their respective sets of stator teeth 34 in planes that are perpendicular to rotational axis 41. Excitation winding 38 is concentric with rotational axis 41, and both radially beyond and axially adjacent to rotor 44 and rotor teeth 46.

Stator yoke 32, stator teeth 34, rotor 44 and rotor teeth 46 are made of a ferromagnetic material such as iron or of a ferrimagnetic material such as ferrite, as described above. Loops 48 of magnetic flux created by direct electrical current in excitation winding 38 are closed via rotor 44, rotor teeth 46, stator teeth 34 and stator yoke 32.

The rotor teeth 46 projecting from either axial side of rotor 44 are equally spaced azimuthally, preferably with the same pitch angle $P_1$ as the facing stator teeth 34. As a result, there are more rotor teeth 46 on either axial side of embodiment 30 than there are facing stator teeth 34. For example, in the particular case illustrated in FIGS. 4A and 4B, there are twelve rotor teeth on either axial side of rotor 44. As in embodiment 130, at any given rotational position of shaft 40, the electrical phase relationship between rotor teeth 46 and one set of stator teeth 34 is shifted by 360°/m with respect to the electrical phase relationship between rotor teeth 46 and a neighboring set of stator teeth 34. For example, in the particular case illustrated in FIGS. 4A and 4B, if three of rotor teeth 46 are exactly opposite stator teeth 34 of one set, then another three of rotor teeth 46 lead stator teeth 34 of a second set by 10° of pitch, and yet another three of rotor teeth 46 lag stator teeth 34 of a third set by 10° of pitch. As a result, when direct electrical current is supplied to excitation winding 38 and shaft 40 is rotated, the alternating EMFs excited in the three excitation coils 36 on one side of embodiment 30 are 120° out of phase with respect to each other. In other words, each side of embodiment 30 generates three-phase alternating EMF.

In terms of physical construction, stator yoke 32 consists of two matching halves that are C-shaped in axial cross section, as shown in FIG. 4A. Therefore, it is straightforward to automate the winding of armature windings 36 separately in each half of stator yoke 32. Furthermore, excitation winding 38 can be formed as two separate halves, each half being wound separately on each half of stator yoke 32.

It will be appreciated that stator teeth 34 or 134 on one axial side of embodiment 30 or 130, respectively, need not be azimuthally opposite stator teeth 34 or 134 on the other axial side of embodiment 30 or 130, respectively. In particular, shifting stator teeth 34 or 134 on one side 90 electrical degrees ahead of stator teeth 34 or 134 on the other side, or shifting rotor teeth 46 or 146 on one side 90 electrical degrees ahead of rotor teeth 46 or 146 on the other side, allows the reactive power of the generator to be controlled and regulated. The closure of flux loops 148 illustrated on the top of FIG. 2A is appropriate to this situation, in which stator teeth 134 or rotor teeth 146 on the two sides of embodiment 130 are mutually shifted. The closure of flux loop 148 illustrated on the bottom of FIG. 2A is appropriate to the situation in which stator teeth 134 and rotor teeth 146 on the two sides of embodiment 130 are not mutually shifted. It is important to note that the two illustrated closures of flux loops 148 refer to two different variants of embodiment 130, it being impossible for flux loops 148 to be closed in both ways within the same electrical machine.

In addition, rotor teeth 46 or 146 on axially opposite sides of rotor 44 or 144 may be provided with different shapes, to give different waveforms to the alternating EMF generated on the two axial sides of embodiment 30 or 130, respectively.

Furthermore, the number of stator teeth 34 or 134 on different axial sides of embodiment 30 or 130, respectively, need not be the same, the number of sets of stator teeth 34 or 134 on different axial sides of embodiment 30 or 130, respectively, need not be the same, and the pitch $P_1$ between neighboring stator teeth 34 or 134 on different axial sides of embodiment 30 or 130, respectively, need not be the same. In the latter asymmetric variant of embodiment 30 or embodiment 130, alternating EMF of two different frequencies is generated on the two axial sides of embodiment 30 or embodiment 130. These two alternating EMFs of different frequencies may be heterodyned to produce alternating EMF at the difference frequency. Embodiments 30 and 130 thus function as particularly compact low-frequency generators. In this asymmetric variant of embodiment 30, excitation winding 30 must be formed as two separate halves, as described above, to make the magnetic circuits of one side of this asymmetric variant of embodiment 30 independent of the magnetic circuits of the other side.

Figure 5:
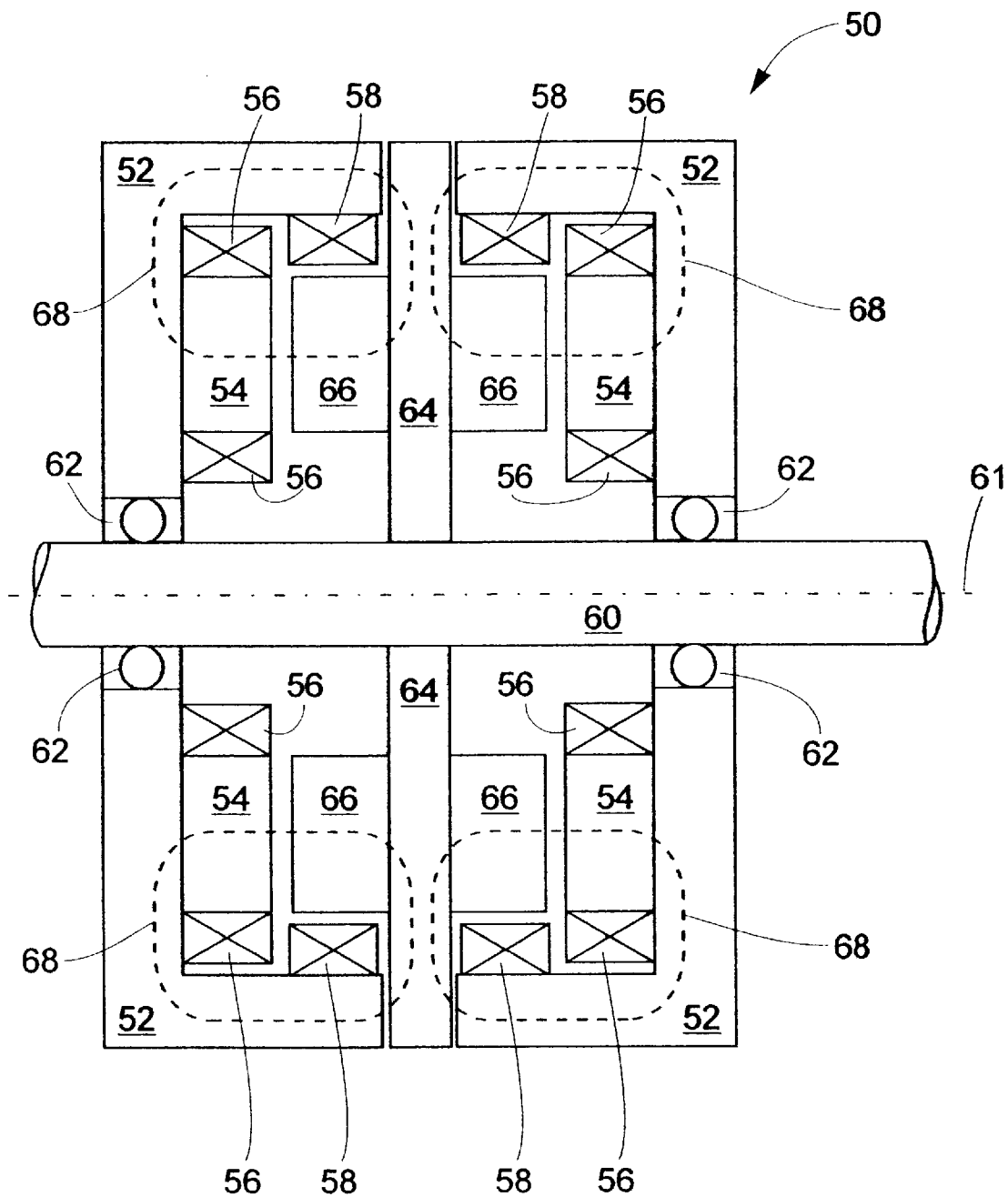
FIG. 5 is an axial cross section of a third embodiment of an electrical machine of the present invention.

FIG. 5 is an axial cross section of a third embodiment 50 of an electrical machine of the present invention. The stator of embodiment 50 consists of a stator yoke 52 within the two axial halves of which are rigidly mounted a plurality of stator teeth 54, grouped in sets as in embodiment 30. Around each set of stator teeth 54 is wound an armature winding 56. Rigidly attached to each half of stator yoke 52 axially inward (as drawn) or axially outward from stator teeth 54 is an annular toroidal excitation winding 58. Rotatably mounted in stator yoke 52, on bearings 62, is a shaft 60. Shaft 60 is free to rotate about a rotational axis 61. Rigidly attached to shaft 60 between the two halves of stator yoke 52 is disk-shaped rotor 64, from either axial side of which project a plurality of rotor teeth 66. Stator teeth 54 are disposed in a circle around rotational axis 61, so that rotor teeth 66 are radially adjacent to stator teeth 54. Armature windings 56 are wound around their respective sets of stator teeth 54 in planes that are perpendicular to rotational axis 61. Excitation windings 58 are concentric with rotational axis 61, and both radially beyond and axially adjacent to rotor teeth 66. In fact, the principal structural difference between embodiments 30 and 50 is that in embodiment 50, rotor 64 intervenes between the two matching halves of stator yoke 52. The two matching halves of stator yoke 52 are rigidly mounted within a housing (not shown).

As in the case of embodiments 30 and 130, stator yoke 52, stator teeth 54, rotor 64 and rotor teeth 66 are made of a ferromagnetic material such as iron or of a ferrimagnetic material such as ferrite, as described above. Loops 68 of magnetic flux created by direct electrical current in excitation windings 58 are closed via rotors 64, rotor teeth 66, stator teeth 54 and stator yoke 52. Embodiment 50 functions essentially in the same way as embodiment 30.

Figure 6:
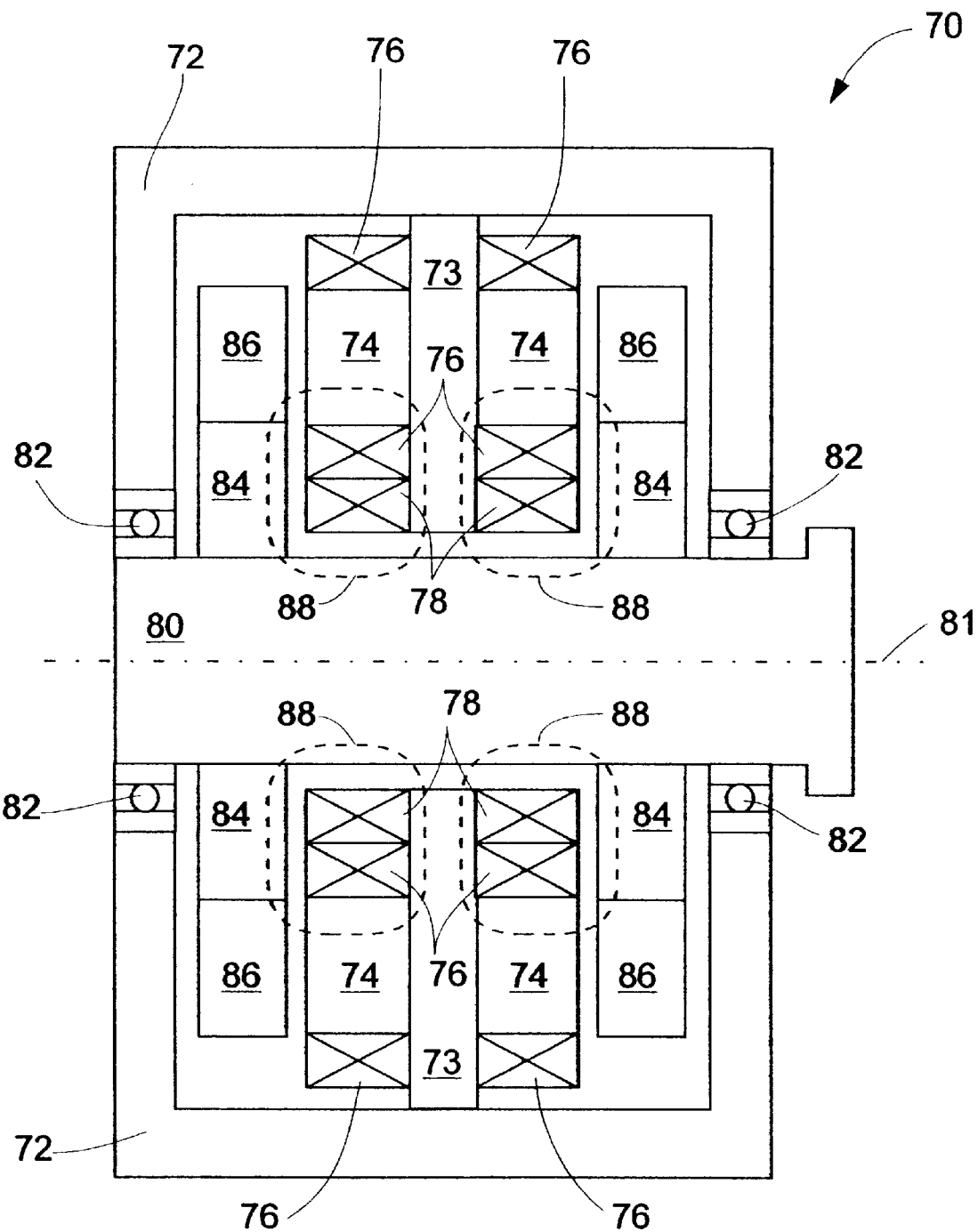
FIG. 6 is an axial cross section of a fourth embodiment of an electrical machine of the present invention

FIG. 6 is an axial cross section of a fourth embodiment 70 of an electrical machine of the present invention. The stator of embodiment 70 consists of a cylindrical stator yoke 72 divided into two halves by an annular ferromagnetic partition 73. On either axial side of partition 73 are rigidly mounted a plurality of stator teeth 74, grouped in sets as in embodiments 30, 50 and 130. Around each set of stator teeth 74 is wound an armature winding 76. Also rigidly mounted on either axial side of partition 73, radially inward from stator teeth 74 and armature windings 76, are two annular toroidal excitation windings 78. Rotatably mounted in stator yoke 72, on bearings 82, is a ferromagnetic shaft 80. Shaft 80 is free to rotate about a rotational axis 81. Rigidly attached to shaft 80 and axially outboard from windings 76 and 78 are two annular rotors 84 from which project radially outward pluralities of rotor teeth 86. Stator teeth 74 are disposed in a circle around rotational axis 81, and rotor teeth 86 are radially adjacent to stator teeth 74. Armature windings 76 are wound around their respective sets of stator teeth 74 in planes that are perpendicular to rotational axis 81. Excitation windings 78 are concentric with rotational axis 81.

As in the case of embodiments 30, 50 and 130, stator teeth 74, rotor 84 and rotor teeth 86 are made of a ferromagnetic material such as iron or of a ferrimagnetic material such as ferrite, as described above. As noted above, partition 73 and shaft 80 also are made of a ferromagnetic material, so that loops 88 of magnetic flux created by direct electrical current in excitation windings 78 are closed via shaft 80, rotors 84, rotor teeth 86 and partition 73. Embodiment 70 functions in essentially the same way as embodiments 30, 50 and 130.

Figure 7:
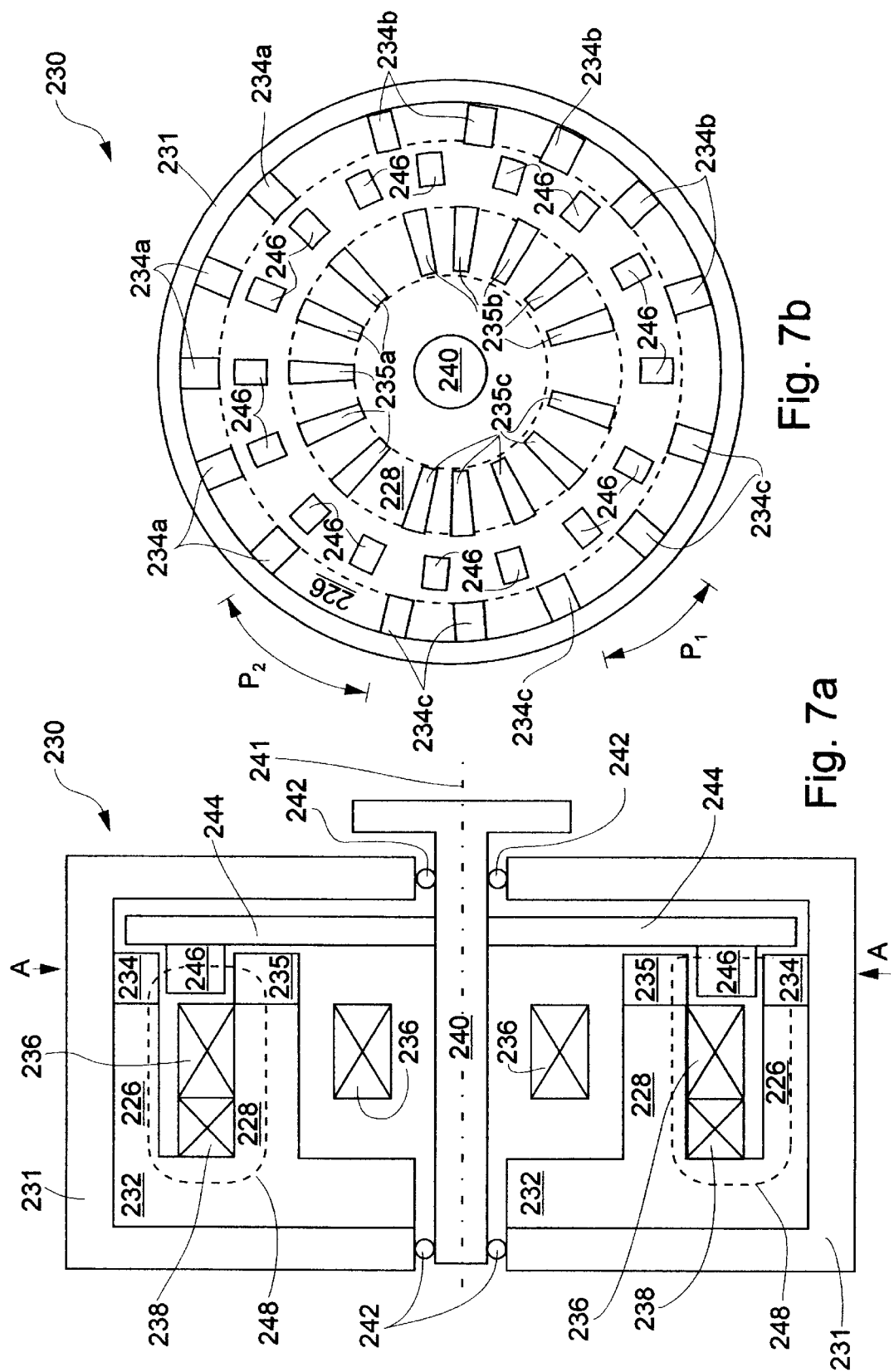
FIG. 7A is an axial cross section of a fifth embodiment of an electrical machine of the present invention.
FIG. 7B is a transverse cross section of the embodiment of FIG. 7A

FIGS. 7A and 7B are, respectively, axial and transverse cross sections of a fifth embodiment 230 of an electrical machine of the present invention. The cross section of FIG. 7B is along cut A—A of FIG. 7A. Unlike the stators of the first four embodiments, the stator of embodiment 230 is one-sided: within a cylindrical nonmagnetic insulating housing 231 is mounted a stator yoke 232 that includes a single inner slotted cylinder 228 and a single outer cylinder 226. Both cylinders 226 and 228 are concentric with a rotational axis 241. Around the rightward facing faces, as seen in FIG. 7A, of cylinders 226 and 228 are rigidly mounted two pluralities of stator teeth 234 and 235, equal in number. Outer cylinder 226 bears three sets of stator teeth 234, labeled a, b and c in FIG. 7B. Inner cylinder 228 bears three sets of stator teeth 235, labeled a, b and c in FIG. 7B. Teeth 234 are azimuthally adjacent to corresponding teeth 235. Cylinders 226 and 228 are shown in phantom in FIG. 7B.

As in embodiment 130, within each set of stator teeth 234 and 235, the azimuthal pitch between neighboring stator teeth 234 or 235 is an angle $P_1$; and the azimuthal pitch between an outer stator tooth 234 or 235 of one set and the neighboring outer stator tooth 234 or 235 of the next set is another angle $P_2$; with angles $P_1$ and $P_2$ being related, in general, by $P_2=(n+1/m)P_1$, where n is a nonnegative integer and m is the number of sets of stator teeth 234 (235) on outer cylinder 226 (228). In the particular case illustrated in FIG. 7B, $P_1$ is 22.5°, $P_2$ is 30°, m is 3 and n is 1. Also as in embodiment 130, inner cylinder 228 is divided by slots into three segments that correspond to the three sets of stator teeth 235. Around each segment of inner cylinder 228 is wound, in a plane perpendicular to rotational axis 241, an armature winding 236, just as armature windings 136 are wound around the segments of inner cylinder 128. Also wound around inner cylinder 228, to the left of armature windings 236 as seen in FIG. 7A, is an annular toroidal excitation winding 238.

Rotatably mounted in stator yoke 232, on bearings 242, is a shaft 240. Shaft 240 is free to rotate about rotational axis 241. Rigidly attached to shaft 240, to the right of cylinders 226 and 226 as seen in FIG. 7A, is a disk-shaped rotor 244 which bears a plurality of equally spaced rotor teeth 246. Rotor teeth 246 are axially adjacent to, and radially in-between, stator teeth 234 and 235. Preferably, the tooth pitch of rotor teeth 246 is the same as the pitch angle $P_1$ of stator teeth 234 and 235, as illustrated in FIG. 7B for the case of 16 rotor teeth 246.

Stator yoke 232, stator teeth 234 and 235 and rotor teeth 246 are made of a ferromagnetic material such as iron, or of a ferrimagnetic material such as ferrite, as described above. Rotor 244 is made of a nonmagnetic insulator, because only rotor teeth 246 are needed to close loops 248 of magnetic flux along with stator teeth 234 and 235 and stator yoke 232.

Embodiment 230 works in the same manner as the first four embodiments. Direct electrical current is supplied to excitation winding 238. Shaft 240 and rotor 244 are rotated about axis 241. As rotor teeth 246 sweep past stator teeth 234 and 235, three phase alternating EMF is created in armature coils 236. The advantage of embodiment 230 over the other four embodiments is its compactness. In the other four embodiments, the forces between the rotor teeth and the stator teeth are predominantly axial. Therefore, for mechanical stability, those embodiments must be axially symmetrical, with a central rotor sandwiched axially between two sides of a stator yoke, as in embodiments 130, 30 and 50, or with central stator yoke 72 sandwiched axially between two rotors, as in embodiment 70. In embodiment 230, the forces between rotor teeth 246 and stator teeth 234, 235 are predominantly radial, and are balanced by the inherent rotational symmetry of embodiment 230 around axis 241.

Figure 8:
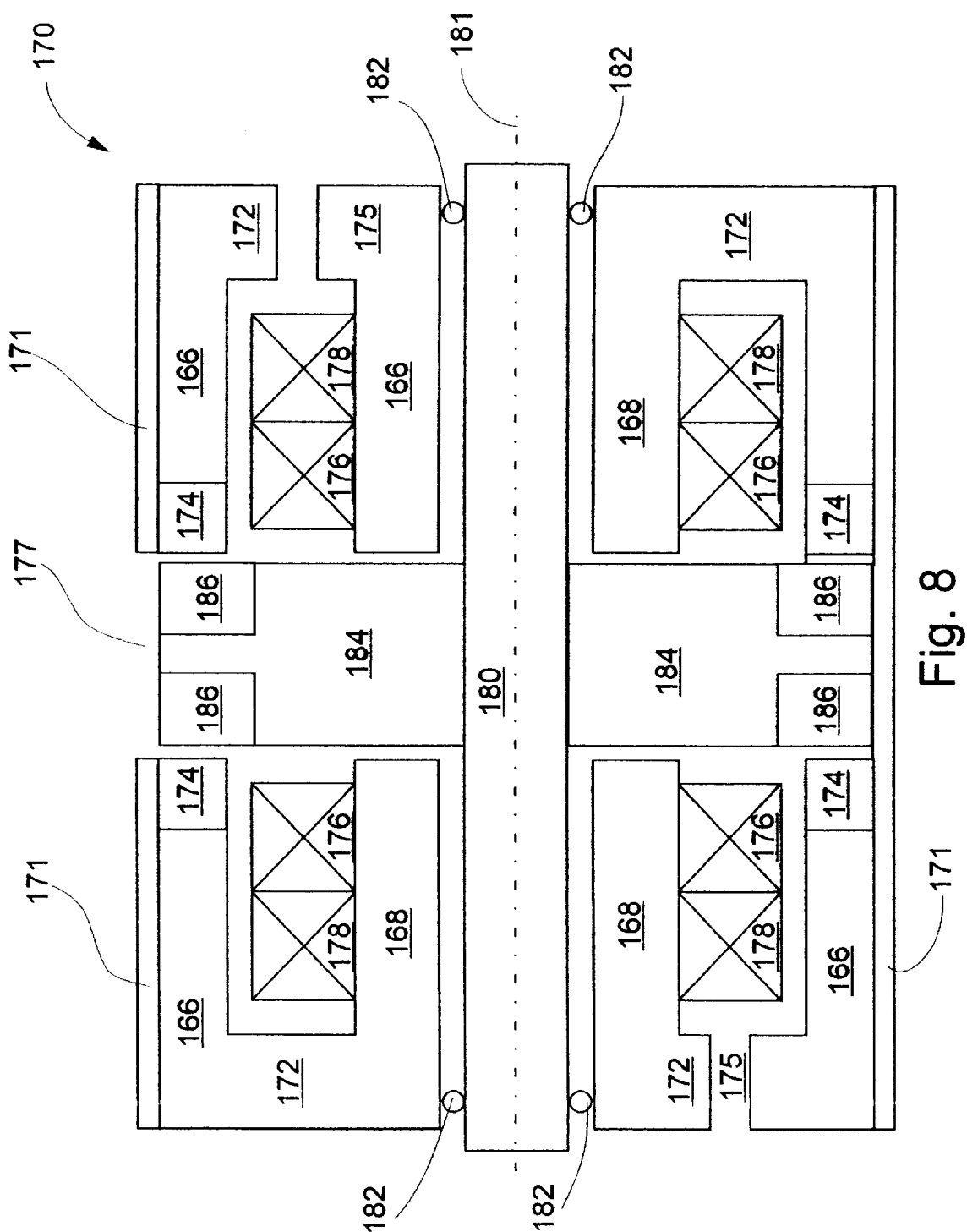
FIG. 8 is a transverse cross section of a sixth embodiment of an electrical machine of the present invention.
Figure 9:
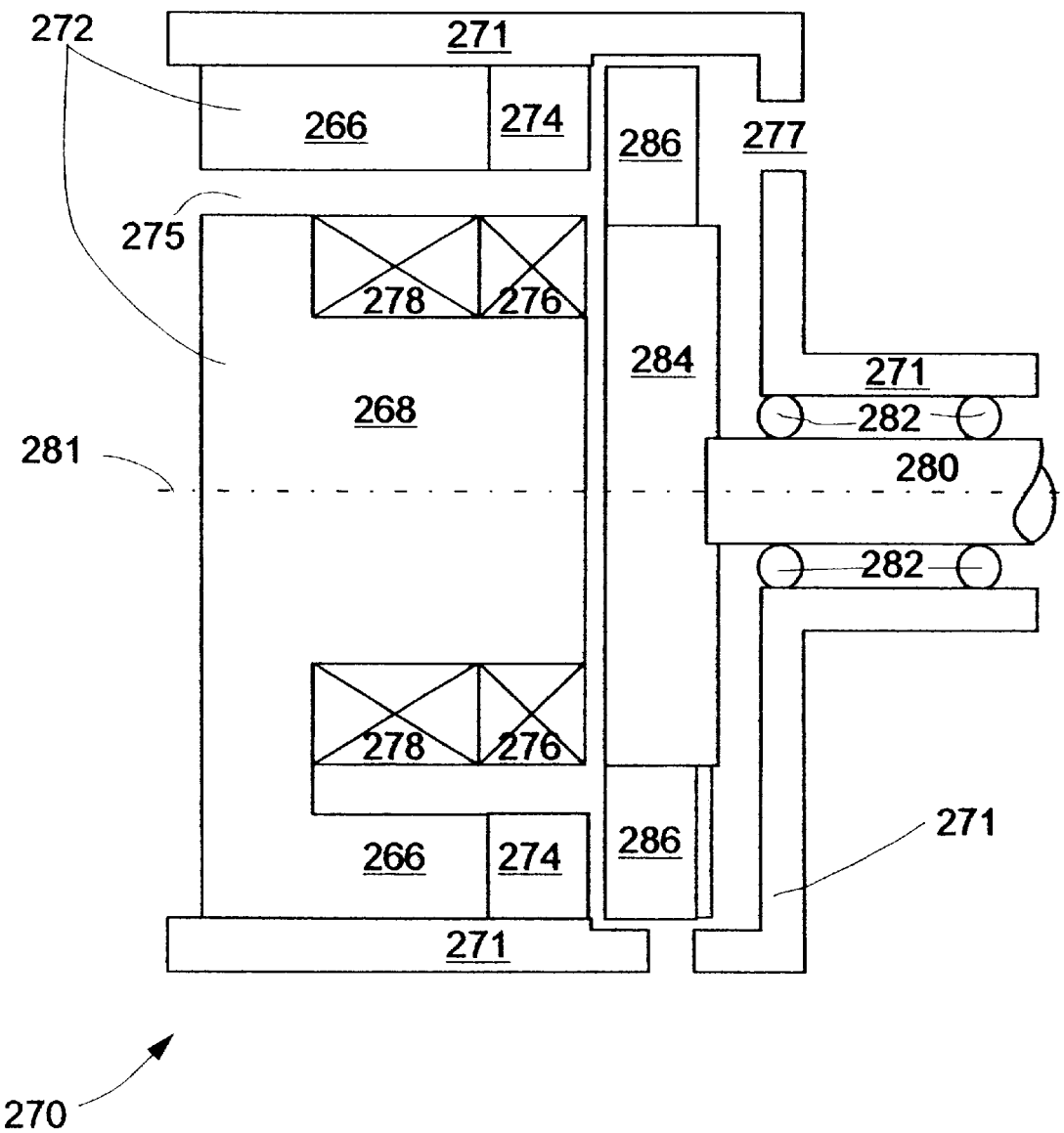
FIG. 9 is a transverse cross section of a seventh embodiment of an electrical machine of the present invention.

The first five embodiments of an electrical machine of the present invention all are three-phase machines. FIGS. 8 and 9 show axial cross sections of single phase machines.

FIG. 8 is an axial cross section of a two-sided embodiment 170 of a single phase machine of the present invention. Within a hollow cylindrical nonmagnetic insulating housing 171 is mounted a stator yoke 172 that includes, in each of two matched facing halves thereof, an inner cylinder 168 and an outer cylinder 166, both of which are concentric with a rotational axis 181. Around each of the axially inward faces of outer cylinders 166 is rigidly mounted an evenly spaced plurality of stator teeth 174. Wound around each inner cylinder 168 are an annular toroidal armature winding 176 and an annular toroidal excitation winding 178. Excitation windings 178 are shown axially outward from armature windings 176. Alternatively, excitation windings 178 may be axially inward form armature windings 176.

Rotatably mounted in stator yoke 172, on bearings 182, is a shaft 180. Shaft 180 is free to rotate about rotational axis 181. Rigidly attached to shaft 180 between the two halves of stator yoke 172 is a disk-shaped rotor 184. The periphery of rotor 184 bears two sets of equally spaced rotor teeth 186, with each set of rotor teeth facing stator teeth 174 on the corresponding half of stator yoke 172. The number of rotor teeth 186 on one axial side of rotor 184 is the same as the number of stator teeth 174 on the facing outer cylinder 166. Stator yoke 172, stator teeth 174, rotor 184 and rotor teeth 186 are made of a ferromagnetic material such as iron, or of a ferrimagnetic material such as ferrite, as described above.

Air cooling of embodiment 170 is provided by circulation of air through ports such as ports 175 in stator yoke 172 and port 177 in housing 171, impelled by rotating rotor 184 acting as a fan.

When direct electric current is provided to excitation windings 178 and shaft 180 is rotated about axis 181, alternating EMFs are generated in armature windings 176. If the numbers of rotor teeth 186 on the two axial sides of rotor 184 differ, then these EMFs are generated at different frequencies. The two EMFs may be heterodyned to produce an EMF at the difference frequency.

FIG. 9 is an axial cross section of a one-sided embodiment 270 of a singe phase machine of the present invention. Within a hollow cylindrical nonmagnetic insulating housing 271 is mounted a stator yoke 272 that includes an inner cylinder 268 and an outer cylinder 266, both of which are concentric with a rotational axis 281. Around the rightward-facing face of outer cylinder 266 are rigidly mounted an evenly spaced plurality of stator teeth 274. Wound around inner cylinder 268 are an annular toroidal armature winding 276 and an annular toroidal excitation winding 278. Excitation winding 278 is shown to the left of armature winding 276. Alternatively, excitation winding 278 may be to the right of armature winding 276.

Rotatably mounted in housing 271, on bearings 272, is a shaft 280. Shaft 280 is free to rotate about rotational axis 281. Rigidly attached to shaft 280 and axially to the right of stator yoke 272 is a disk-shaped rotor 284. The periphery of rotor 284 bears equally spaced rotor teeth 286, equal in number to stator teeth 274. Stator yoke 272, stator teeth 274, rotor 284 and rotor teeth 286 are made of a ferromagnetic material such as iron, or of a ferrimagnetic material such as ferrite, as described above.

Air cooling of embodiment 270 is provided by circulation of air through ports such as port 275 in stator yoke 272 and ports 277 in housing 271, impelled by rotating rotor 284 acting as a fan.

When direct electric current is provided to excitation winding 278 and shaft 280 is rotated about axis 281, an alternating EMF is generated in armature winding 276.

While the invention has been described with respect to a limited number of embodiments, it will be appreciated that many variations, modifications and other applications of the invention may be made.

What is claimed is:

1. A synchronous electrical machine comprising:
  (a) a stator including:
    (i) a first plurality of stator teeth disposed in a circle around a rotational axis, each of said stator teeth of said first plurality being at a respective azimuthal position on said stator, said first plurality of stator teeth including an integral number m, greater than 1, of first sets of said stator teeth of said first plurality, each of said first sets including a same number, greater than 1, of said stator teeth of said first plurality, said stator teeth of each of said first sets being separated azimuthally by a certain tooth pitch, said first sets being separated azimuthally by a set pitch different from said tooth pitch, and
    (ii) a second plurality of stator teeth including an integral number m', greater than 1, of second sets of said stator teeth of said second plurality, each of said second sets including a same number, greater than 1, of said stator teeth of said second plurality, said stator teeth of each of said second sets being separated azimuthally by a tooth pitch different from said tooth pitch of said first sets, said second sets being separated azimuthally by a set pitch different from said tooth pitch of said second sets; and
  (b) at least one rotor, coaxial with said stator on said rotational axis, said at least one rotor including a first plurality of rotor teeth disposed in a circle around said rotational axis, said rotor operative to rotate about said rotational axis among a plurality of rotational positions relative to said stator, so that in each of said plurality of rotational positions, an electrical phase difference between each of said stator teeth of said first plurality and an azimuthally nearest of said rotor teeth of said first plurality is a stepwise function of said azimuthal position of said each stator tooth of said first plurality.

2. The synchronous electrical machine of claim 1, including a different number of said first plurality of rotor teeth than of said first plurality of stator teeth.

3. The synchronous machine of claim 1, wherein said set pitch of said first sets is equal to (n+1/m) times said tooth pitch of said first sets, n being an integer greater than −1.

4. The synchronous electrical machine of claim 1, wherein said set pitch of said second sets is equal to (n'+1/m') times said tooth pitch of said second set, n' being an integer greater than −1.

5. The synchronous electrical machine of claim 1, wherein m=m'.

6. The synchronous electrical machine of claim 1, wherein said second sets of said stator teeth are axially displaced from and radially opposite said first sets of said stator teeth.

7. The synchronous electrical machine of claim 6, wherein said first plurality of rotor teeth are equally spaced around said rotational axis by said tooth pitch of said first sets of said stator teeth and are axially displaced from and radially adjacent to said first sets of said stator teeth, and wherein said at least one rotor further includes a second plurality of rotor teeth disposed in a circle around said rotational axis and equally spaced around said rotational axis by said tooth pitch of said second set of said stator teeth, said second plurality of rotor teeth being axially displaced from and radially adjacent to said second sets of said stator teeth.

8. The synchronous electrical machine of claim 7, wherein said first and second pluralities of said rotor teeth are between said first and second pluralities of stator teeth.

9. The synchronous electrical machine of claim 7, wherein said first and second pluralities of said stator teeth are between said first and second pluralities of said rotor teeth.

10. The synchronous electrical machine of claim 9, including two of said at least one rotor, said first plurality of said rotor teeth projecting radially outward from a first of said two rotors and said second plurality of said rotor teeth projecting radially outward from a second of said two rotors.

11. The synchronous electrical machine of claim 7, further comprising:
  (c) an excitation winding, rigidly attached to said stator, coaxial with said rotational axis, and axially adjacent to both of said pluralities of said rotor teeth.

12. The synchronous electrical machine of claim 7, further comprising:
  (c) two excitation windings, rigidly attached to said stator and coaxial with said rotational axis.

13. The synchronous electrical machine of claim 12, wherein each of said excitation windings is axially adjacent to a different one of said two pluralities of said rotor teeth.

14. The synchronous electrical machine of claim 12, wherein each of said excitation windings is axially adjacent to a different one of said two pluralities of said stator teeth.

15. The synchronous electrical machine of claim 1, wherein said second sets of said stator teeth are radially displaced from and azimuthally opposite said first sets of said stator teeth.

16. The synchronous electrical machine of claim 1, further comprising:

(c) for each of said first sets of stator teeth, a corresponding armature winding.

17. The synchronous electrical machine of claim 16, wherein said corresponding armature winding surrounds said each first set of stator teeth in a plane perpendicular to said rotational axis.

18. The synchronous electrical machine of claim 1, wherein said first plurality of said rotor teeth are equally spaced, around said at least one rotor, by said tooth pitch of said first plurality of stator teeth.

19. The synchronous electrical machine of claim 1, wherein said first plurality of said rotor teeth are axially displaced from and radially adjacent to said first plurality of said stator teeth.

20. The synchronous electrical machine of claim 1, wherein said first plurality of said rotor teeth project radially outward from said rotor.

21. The synchronous electrical machine of claim 1, further comprising:
- (c) an excitation winding, rigidly attached to said stator and coaxial with said rotational axis.

22. A synchronous electrical machine comprising:
- (a) a stator including:
  - (i) a first plurality of stator teeth disposed in a circle around a rotational axis, each of said stator teeth of said first plurality being at a respective azimuthal position on said stator, said first plurality of stator teeth including an integral number m, greater than 1, of first sets of said stator teeth of said first plurality, each of said first sets including a same number, greater than 1, of said stator teeth of said first plurality, said stator teeth of each of said first sets being separated azimuthally by a certain tooth pitch, said first sets being separated azimuthally by a set pitch different from said tooth pitch, and
  - (ii) a second plurality of stator teeth including an integral number m', greater than 1, of second sets of said stator teeth of said second plurality, each of said second sets including a same number, greater than 1, of said stator teeth of said second plurality, said stator teeth of each of said second sets being separated azimuthally by a certain tooth pitch, said second sets being separated azimuthally by a certain set pitch different from said tooth pitch of said first sets, said second sets of said stator teeth being radially displaced from and axially opposite said first sets of said stator teeth; and
- (b) at least one rotor, coaxial with said stator on said rotational axis, said at least one rotor including a first plurality of rotor teeth disposed in a circle around said rotational axis, said rotor operative to rotate about said rotational axis among a plurality of rotational positions relative to said stator, so that in each of said plurality of rotational positions, an electrical phase difference between each of said stator teeth of said first plurality and an azimuthally nearest of said rotor teeth of said first plurality is a stepwise function of said azimuthal position of said each stator tooth of said first plurality.

23. The synchronous electrical machine of claim 22, wherein said rotor teeth are axially adjacent to and radially in-between said first and second pluralities of stator teeth.

* * * * *